Sept. 4, 1956   B. H. SHORT ET AL   2,761,537
WINDSHIELD WIPER ACTUATING MECHANISM
Filed March 8, 1952   2 Sheets-Sheet 1
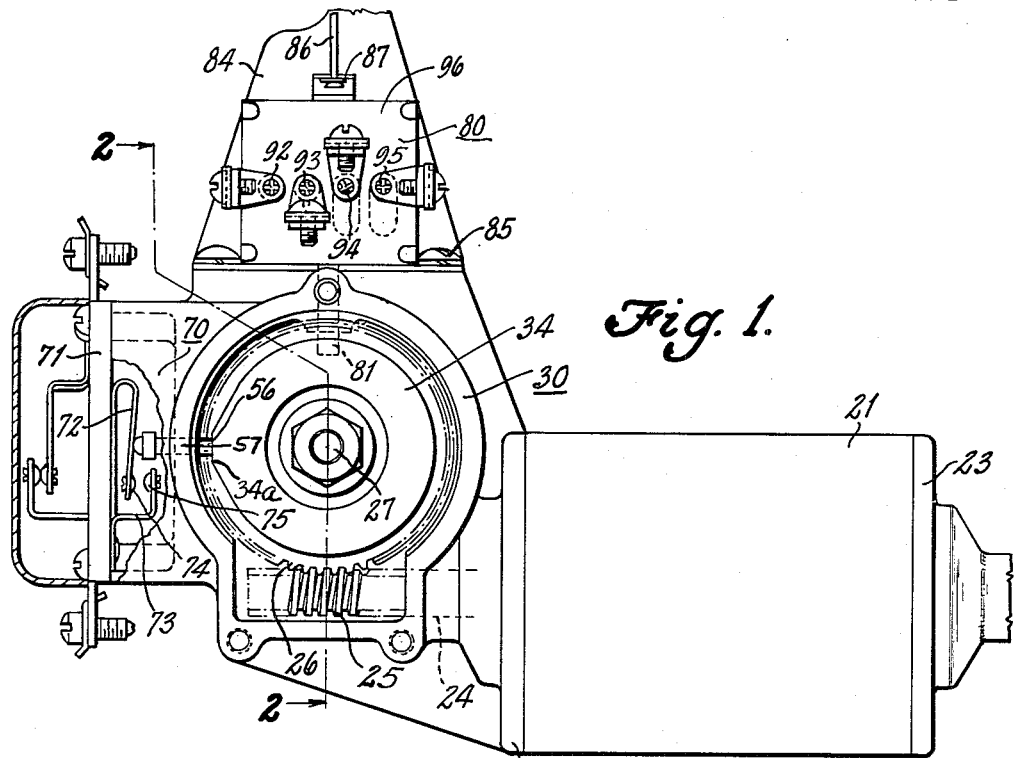

INVENTORS
BROOKS H. SHORT
BY JAMES H. FLATT

Willits, Hardman & Fehr
their ATTORNEYS

United States Patent Office 2,761,537
Patented Sept. 4, 1956

2,761,537

WINDSHIELD WIPER ACTUATING MECHANISM

Brooks H. Short and James H. Flatt, Anderson, Ind., assignors to General Motors Corporation, Detroit, Mich., a corporation of Delaware Application March 8, 1952, Serial No. 275,528

10 Claims. (Cl. 192—.02)

This invention relates to an improved power transmission mechanism for operating a shaft.

The basic object is to provide a power driven windshield wiper wherein the blade may be parked in a predetermined position upon deenergization of the power device.

In carrying out the above object it is a further object to provide means between a motor and a windshield wiper which are engageable upon energization of the motor and which are disengageable upon deenergization of the motor to stop the blade in a predetermined position.

Another object of the present invention is to provide a simple and improved power transmission mechanism driven by an electric motor, said mechanism being operative in one direction to rotate a shaft and to stop the shaft at a certain point substantially simultaneously as the electric motor is rendered deenergized.

Another object of the invention is to provide a power transmission device which, after the drive shaft has stopped rotating and the driving motor is deenergized, permits the motor to coast to a stop without rotating the shaft.

Another object of the invention is to provide a power transmission device with a driving member operatively connected with a shaft in which the driving member is operatively connected to a gear rotatable on the shaft by a yieldable connection attached to the driving member but being releasable to permit the gear to rotate a short angular distance relatively to the shaft and driving member when the shaft has stopped rotating.

Another object of the present invention is to provide certain improvements in the type of windshield wiper which includes an electrically operated windshield wiper motor, means for operating a wiper including a drive plate and a drive shaft connected to the motor, a control switch for turning the motor on and off, latching means associated with the control switch which is effective to lock positively the drive plate in a predetermined position when the switch is turned off, a holding circuit around the control switch, and a cycling switch in the holding circuit effective each revolution of the drive shaft to open the holding circuit whereby the motor may operate to turn the drive shaft a sufficient distance after the control switch is opened for parking the wiper blade.

Further objects and advantages of the present invention will be apparent from the following description, reference being had to the accompanying drawings wherein a preferred embodiment of the present invention is clearly shown.

In the drawings:

Fig. 1 is a side elevation of a motor construction embodying the present invention.

Fig. 2 is a sectional view taken on line 2—2 of Fig. 1.

Figure 3:
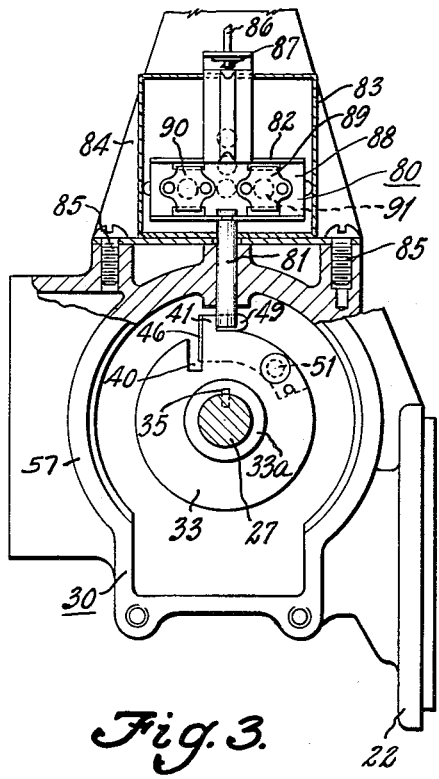
Fig. 3 is a sectional view taken on line 3—3 of Fig. 2.
Figure 4:
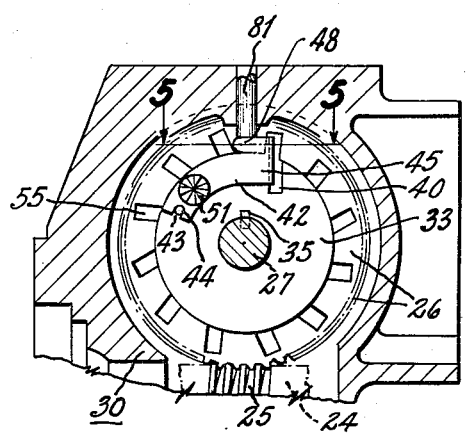
Fig. 4 is a sectional view taken on line 4—4 of Fig. 2.
Figure 5:
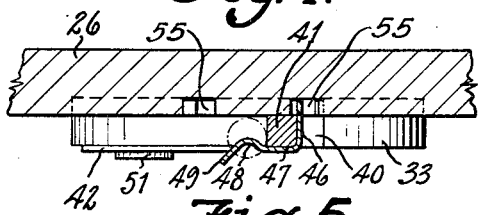
Fig. 5 is an enlarged sectional view taken on line 5—5 of Fig. 4 and showing the driving mechanism in its operative position.

Referring to the drawings, 20 designates a shunt motor having a tubular frame 21 provided with end members 22 and 23 which support bearings, not shown. The bearings in the end members support an armature shaft 24 which includes a driving element or worm 25 which meshes with a worm gear 26 supported on a shaft 27 journaled in bearings 28 and 29.

The end member 22 is shaped to provide a housing 30 which encloses the worm 25 and the worm gear 26. The right end of the housing as viewed in Fig. 2 is closed by a cover or closure 31 attached to the housing by screws. The cover supports the bearing 28. The housing 30 has a wall partition 32 which supports the bearing 29. The shaft 27 supports a drive plate 33 having a central flanged bearing 33a which rotatably supports the worm gear 26 and a disc 34 is journalled on the shaft 27. Both the worm gear 26 and the disc 34 are made of suitable insulating material. The drive plate 33 and the cam 34 are operatively connected to the shaft 27 by a key 35. A nut 36 and washers 37 maintain the parts 34, 26 and 33 in the correct position on the shaft 27.

The driving disc member is formed with a notch 40 and has an abutment 41 projecting beyond the periphery of the driving disc. One side of the projection forms a continuation of one wall of the notch 40. A leaf spring member 42, constituting a clutch member, is attached to the drive plate 33. The spring member in this instance is arc-shaped and includes a notch 43 at one end to receive a pin 44 press fitted in a hole provided by the drive plate 33. The other end of the leaf is enlarged at 45. The enlarged portion is bent at a right angle to the normal plane of the leaf spring to provide a driving tang or finger 46 whose length is greater than the thickness of the portion of the plate 33, protruding from the worm gear 26. The enlarged portion is also severed behind the tang 46 to provide a resilient arm 47. This arm is formed to provide a spherical portion 48 and an angular extension 49. When the leaf spring is assembled to the drive disc 33 the notch 43 straddles the pin 44 and then the finger or tang 46 is brought firmly against a face 50 formed by the projection 41 and the slot 40. The leaf spring is attached to the drive plate by a rivet 51. The pin 44 prevents the leaf spring from turning on the rivet.

The worm gear 26, constituting another clutch member, is formed with central opening 52, recesses 53 and 54 disposed on the face thereof, and with a series of notches 55 extending outwardly from the marginal wall of the recess 53. The opening 52 receives the bearing flange 33a and the recess 53 receives a portion of the drive plate 33. The notches 55 at one time or another receive the finger 46 which provides the clutch or driving connection between the worm gear 26 and the drive disc 33. The recess 54 of the worm gear 26 receives a reduced portion of the disc member 34. The disc includes a cam portion 34a for operating a plunger 56 slidably supported in a bearing opening in a cylindrical wall 57 of the housing 30. The plunger 56 actuates a switch 70 to be described.

The left end of the shaft 27 may be connected with a driven member 60 of a torque limiting device 61 as shown in the copending application of A. G. Lautzenhiser et al., Ser. No. 221,048, filed April 14, 1951.

As mentioned heretofore the cam portion 34a of a disc is adapted to engage the plunger 56 which extends into the interior of a housing for actuating the switch. The switch 70 as shown in Fig. 1 is mounted on an insulating plate 71 and includes a pair of switch blades 72 and 73 carrying contacts 74 and 75 respectively. The blade 72 is biased so that contact 74 will normally engage contact 75 except when the engagement is broken by pin 56, as determined by cam 34a. This switch is used in parallel with a manually operated switch 80 to be described. When the switch 80 has been opened, the contacts 74 and 75 remain closed until the proper point for parking has been reached. At that instant the points are separated by pin 56, and the motor is deenergized.

Fig. 3 illustrates a switch structure 80 which is used with the present invention to control the motor and controls the position of a stud or rod 81. The rod 81 is attached to a preformed sheet metal member 82 which has a portion movable within a switch case 83 attached to a bracket 84. The bracket 84 is attached to the housing 30 by screws 85. A Bowden wire 86 arrangement is connected to the metal member 82 outside the casing as at 87. The Bowden wire 86 is actuated by a knob, not shown, from a suitable support. The portion of the member 82 within the casing supports a non-conducting carrier 88 which carries bridging members 89 and 90 having spherical contact buttons. Springs 91 carried by the carrier 88 urge the bridging members 89 and 90 toward stationary contacts 92, 93, 94 and 95 carried by a closure 96. Electric current may be supplied to the switch 80 from a current source 100 by a lead connected to a terminal 101 which is connected to an overload circuit breaker or switch 102. The switch 102 is connected by a lead 103 to a terminal 104 which is connected by a wire 105 to the stationary contact 92 of switch 80.

The operation of the apparatus is as follows: When the operator pulls on the knob to actuate the switch 80 the pin or stud 81 is moved out of engagement with the leaf spring 72 and the path of the abutment 41 and concurrently the finger 46 is biased to its normal position and extends into an adjacent notch 55. The finger 46 provides the driving connection between the worm gear 26 and the plate 33 which is operative to transmit turning movement from the worm gear 26 to the shaft 27 in one direction of rotation. When the switch is moved to the position so that the bridging member 90 bridges contacts 92, 93 the circuit to the motor is closed to energize the motor and causes the motor to operate. As a result the shaft 27 is rotated. As mentioned heretofore the shaft 27 is connected to the torque limiting device 61. Since the shaft 27 is driven by the motor 20, the device is rotated in one direction. In this instance the shaft 27 is connected with the driven member 60 which drives a member 62. The members 60 and 62 enclose a dog and spring as disclosed in the previously referred copending Lautzenhiser et al. application. The member 62 is connected to a crank arm 63. Connection between the crank arm 63 and the wiper blade shafts, not shown, is established by link 110.

Figure 6:
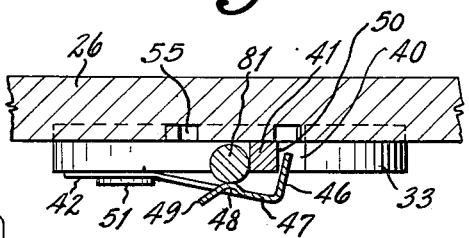
Fig. 6 is a view similar to Fig. 5 but showing the driving mechanism in its inoperative position.
Figure 7:
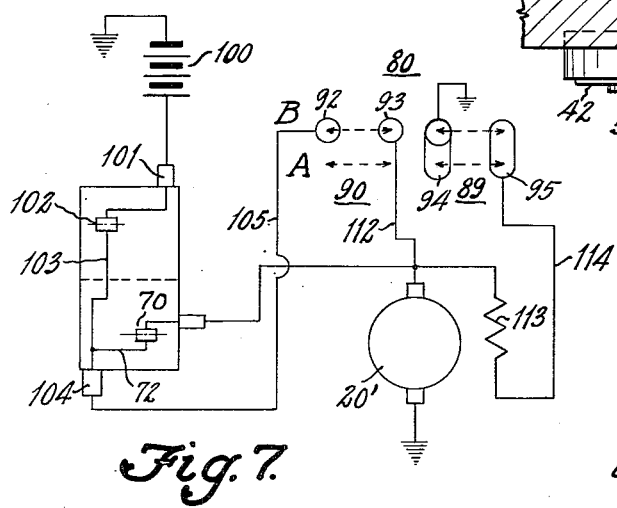
Fig. 7 is a schematic wiring diagram showing the electrical control embodied in the apparatus.

The switching mechanisms will now be described with respect to the wiring diagram shown in Fig. 7. When the stud or pin 81 is in the position shown in Fig. 3, and Fig. 6, the switch will be in the position A in Fig. 7. According to the diagram the motor circuit is established by contacts of switch 70, including contacts 74, 75, in parallel with the main motor circuit which is controlled by the manual switch 80. When a circuit to the motor 20 is made by the switch 80, the motor will operate whether or not current passes through the switch 70. Thus, when the motor is to be operated, the manual switch is actuated to move the bridging contacts 89 and 90 from position A to position B so that current will flow from a current source or battery 100, thence through terminal 101, switch 102, lead 103, terminal 104, lead 105, contacts 92, 90, 93, lead 112, armature 20' to ground, and field winding 113, lead 114, contacts 95, 89, 94 to ground, causing motor 20 to rotate so that through worm 25 and worm gear 26 the drive plate or disc is rotated to turn shaft 27. It is apparent that various types of switches could be used which include resistance to modify operation of the motor, for example, the switch disclosed in the above referred to Lautzenhiser application.

When it is desired to stop the motor, the switch 80 is moved to position A causing the stud 81 to be moved into the path of the resilient arm 47 and the abutment 41. As the drive plate 33 rotates, the resilient arm 47 will slide over the stud 81 to lift the finger 46 out of the notch 55 into the position shown in Fig. 6 to disconnect the driving connection between the drive plate 33 and worm gear 26 and substantially concurrently therewith the abutment 41 will engage the stud 81 to cause the drive plate to stop positively. Simultaneously as the shaft 27 stops, the cam 34a will actuate the plunger 56 to separate contacts 74, 75, to prevent current flow through the motor. When current flow through the motor 20 is discontinued, the motor is deenergized. However, due to inertia it will not stop immediately but will continue to decelerate and coast to a full stop. While coasting to a full stop the motor will still rotate the worm gear 26 about the flange bearing 33a relative to the drive plate 33 and the cam disc 34. Thus during the rotation of the worm gear 26 from the time the motor circuit is broken until the time at which the coasting of the motor actually stops rotation, another notch 55 will be adjacent the notch 40 to receive the finger 46, completely avoiding stalling in making a drive connection between the worm gear and the drive plate. It is pointed out that when the shaft 27 stops rotating it will always occupy the same position. Thus, when the present invention is used to operate a windshield wiper the blades will always stop in a predetermined parking position.

While the embodiment of the present invention as herein disclosed, constitutes a preferred form, it is to be understood that other forms might be adopted.

What is claimed is as follows:

1. In combination with an electric motor, a shaft, a gear rotatable on the shaft and operatively connected with the motor, a driven member attached to the shaft capable of effecting rotation thereof, a leaf spring having one end attached to the driven member and having its free end biased to engage the gear for connecting the driven member with the gear; a manually operated switch connected to the motor; a stud associated with the switch adapted to engage the leaf spring to release the free end of the spring from the gear and concurrently stopping the driven member when the switch is manually operated to open the switch, the gear being free to rotate relative to the driven member while the motor is coasting to a standstill after being rendered inactive.

2. In combination with a power device, a shaft, a gear rotatable on said shaft and operatively connected to the power device; two driven members attached to the shaft, one member providing a cam, the second member being capable of effecting rotation of said shaft; a control device for the power device, cyclically engageable by the cam for rendering the power device inactive; means carried by the second driven member and normally biased to engage the gear for connecting said second driven member with the gear; a manually operative control device for the power device, said manually operative device being capable of normally rendering the power device inactive and engaging said means for biasing it to disconnect the second driven member from the gear, and being operative to render the power device active and to release said means for return to its normal biased position, said manually operative control device in one of its positions providing an abutment engageable by the said second driven member to stop and hold it in the position in which the cam engages the control device to render the power device inactive.

3. In combination with an electric motor, a shaft, power transmitting means between the motor and shaft including a gear rotatable relative to the shaft; a driver attached to the shaft; a releasable clutch carried by the driver and normally engaging the gear; a cam attached to the shaft; a switch connected to the motor and cyclically engaged by the cam; a manually operative switch connected to the motor in shunt relation to said cam operated switch and having means engageable with the clutch for actuating it to disconnect the gear from the driver when said manual switch is operated to render the motor inactive; and means on the driver, engageable by said means on the switch for stopping the cam in switch engaging position.

4. In a device of the character described, the combination with a drive shaft; of a disc secured to said shaft capable of effecting rotation thereof; a second disc attached to the shaft and providing a cam; a gear rotatable relative to said shaft and discs; a power driver connected to said gear; a control element for said power driver operated cyclically by said cam; resilient means attached to the first mentioned disc, and normally biased to engage the gear to establish a driving connection between the gear and the disc; a manually operative control device for the power driver, said device being operable in one position to render said driver inactive and engage the resilient means to hold it out of gear engaging position, and also providing an abutment engageable by the first mentioned disc for stopping it in position in which the cam of the second mentioned disc engages the control element in position for rendering the power driver inactive, said manual control device being operable in another position to render the driver active and release the resilient means for connecting the first mentioned disc to the gear.

5. In a device of the character described, the combination with a drive shaft; of a disc secured to said shaft capable of effecting rotation thereof; a second disc attached to the shaft and providing a cam; a gear rotatable relative to said shaft and discs; a power driver connected to said gear; a control element for said power driver actuated cyclically by said cam; clutch means associated with the first mentioned disc and normally urged to engage the gear for driving the disc; a manually operative control mechanism operable in one position to render the driver inactive and engage the clutch means to disrupt the driving connection between the disc and gear, said control device being operable in another position to render the device active and release the clutch for connecting the disc to the gear; and means on the first mentioned disc engageable by said control mechanism for holding the cam disc in position to render the control element actuated thereby in position to render the device inactive.

6. In combination, a drive shaft; a first driven member operatively connected with the shaft and having an abutment; a second driven member operatively connected to the shaft providing a cam; a slidable plunger cyclically actuated by the cam; a driving element rotatable relative to the shaft and driven members; a power driver connected to the driving element; a switch biased to a closed position to close a circuit to the power driver; resilient means attached to the first driven member and normally biased to engage the driving element for driving the said first member; a manually operated switch for the power driver; a pin associated with the manually operated switch, said pin in the open position of said manually operated switch, engaging the resilient means and holding it out of engagement with the driving element and also engaging the abutment for stopping the shaft in a position in which the cam of the second driver engages the plunger for holding the biased switch in an open position for rendering the power driver inactive, said manually closed switch when operated, moving the pin out of the path of the abutment and also releasing the resilient means for connecting the first driven member to the driving element.

7. In combination with an electric motor, a shaft; a drive plate operatively connected with the shaft and having an abutment thereon; a driving element operatively connected with the motor and rotatable relative to the shaft; a leaf drive spring carried by the plate, said spring having a finger adapted to engage the driving element for driving the plate; a manually controlled switch for connecting the motor in a circuit; and a stud associated with the switch adapted to be inserted into the path of the moving drive plate when the switch is actuated to its open position whereupon the stud engages the abutment to stop the drive plate and also moves the finger out of engagement with the driving element.

8. In combination with an electric motor, a shaft, a gear rotatable on the shaft and operatively connected with the motor; a drive plate operatively connected to the shaft and having an abutment thereon; a latch member carried by the drive plate and normally biased to engage the gear for connecting the plate with the gear; a cam member operatively connected to the shaft; a switch biased to a closed position connected in a circuit to the motor; a plunger for actuating the biased switch to open position, said plunger being cyclically actuated by the cam member; a manually operated switch for completing the circuit to the motor; a stud associated with the manually operated switch adapted to be inserted into the path of the moving drive plate to engage the abutment and stop the drive plate and cam member whereby said cam member is held in engagement with the plunger to open the biased switch and concurrently disengaging the latch member to disconnect the drive plate from the gear, but permits the motor to drive the gear relative to the plate and cam member until the motor stops.

9. Windshield wiper actuating mechanism including in combination, an electric motor, a rotatable driving member operatively connected to said motor, a rotatable driven member, a first energizing circuit for said motor including a manually operable switch controlling motor energization, a second energizing circuit for said motor including an automatically operable switch connected in shunt relation to said manually operable switch and effective to control motor energization independently of said manual switch, means operatively connected to and rotated by said driven member for cyclically opening said automatic switch at a predetermined angular position of said driven member during each revolution thereof, clutch means operatively associated with said members for establishing a driving connection therebetween, and an element operatively associated with said driven member, said clutch means, and said manual switch and operable to open said manual switch, and thereafter concurrently disrupt the driving connection between said members and positively stop rotation of said driven member at said predetermined angular position in which the automatic switch means is opened to deenergize the motor.

10. Windshield wiper actuating mechanism including in combination, an electric motor, a rotatable driving member operatively connected to said motor, a rotatable driven member, a first energizing circuit for said motor including a manually operable switch controlling motor energization, a second energizing circuit for said motor including an automatically operable switch connected in shunt relation to said manually operable switch and effective to control motor energization independently of said manual switch, means operatively connected to and rotated by said driven member for cyclically opening said automatic switch at a predetermined angular position of said driven member during each revolution thereof, clutch means operatively associated with said members for establishing a driving connection therebetween, said clutch means comprising a first clutch member operatively connected to the driving member, and a second clutch member engageable with said first clutch member and carried by said driven member, and an element operatively associated with said driven member, said clutch members and said manual switch and operable to open said manual switch, and thereafter concurrently disengage said clutch members and positively stop rotation of said driven member at said predetermined angular position in which the automatic switch means is opened to deenergize the motor.

References Cited in the file of this patent

UNITED STATES PATENTS

| | | |
|---|---|---|
| 1,146,371 | Thornton | July 13, 1915 |
| 1,952,355 | Belshaw | Mar. 27, 1934 |
| 2,242,674 | Holt | May 20, 1941 |
| 2,335,424 | Korte et al. | Nov. 30, 1943 |
| 2,357,152 | Whitted | Aug. 29, 1944 |
| 2,452,496 | Schneider | Oct. 26, 1948 |
| 2,484,781 | Coffey | Oct. 11, 1949 |
| 2,560,000 | Sacchini | July 10, 1951 |